United States Patent [19]
O'Toole

[11] Patent Number: 5,930,761
[45] Date of Patent: Jul. 27, 1999

[54] TICKET PACKAGE MANAGEMENT SOFTWARE

[76] Inventor: Martin J. O'Toole, 100 Foxhall Dr., Chagrin Falls, Ohio 44022

[21] Appl. No.: 08/677,668

[22] Filed: Jul. 8, 1996

[51] Int. Cl.⁶ .............................. G06F 15/22; G06F 15/20
[52] U.S. Cl. .................................... 705/5; 705/13
[58] Field of Search ............................................ 705/5, 13

[56] References Cited

U.S. PATENT DOCUMENTS

| | | | |
|---|---|---|---|
| 5,239,480 | 8/1993 | Huegel | 364/479 |
| 5,408,417 | 4/1995 | Wilder | 364/479 |

*Primary Examiner*—Allen R. MacDonald
*Assistant Examiner*—Keith B. White

*Attorney, Agent, or Firm*—Pearne, Gordon, McCoy & Granger LLP

[57] ABSTRACT

A computer process which permits easy management of one or more season ticket packages for a ticket administrator. A schedule of games is color-coded to readily indicate ticket availability. The color-codes indicate to the user whether tickets for the game in question are all available, partially available, or not available. The user may place requests for tickets and, should more than one ticket package be available, indicate the ticket package for which tickets are requested. A ticket administrator can review the ticket requests, and convert the ticket requests into a reservation, whereupon the schedule codes are updated to conform with the modified ticket availability.

13 Claims, 22 Drawing Sheets

TICKET PACKAGE MANAGEMENT SOFTWARE

BACKGROUND OF THE INVENTION

Season ticket, skybox, suite, or loge sales to business customers and companies represent a significant portion of ticket sale revenues, and sports teams, theater groups, orchestras, and other entertainment providers want to further develop and expand the sale of multiple event ticket packages to such business users and companies.

One of the primary disadvantages of purchasing suites, loges, season ticket packages or ticket packages to multiple events from a company or businesses perspective has been the fact that the company must appoint a ticket administrator whose function is to distribute tickets to the individual events to users. Moreover, in order to qualify for certain tax benefits for costs associated with ticket purchases and associated expenses, it may be necessary for the company or ticket package owner to keep records detailing the usage of tickets, the person or persons hosted at each event, and the business purpose fostered by attending the event and associated entertainment expenses. Also, for large companies with multiple departments, it is desirable that the costs of the tickets and associated entertainment expenses by allocated to the correct department and, therefore, creates an accounting or billing problem for the ticket administrator. The administrative problems multiply as more packages are purchased by the company to accommodate client/customer requests.

As such, the administration of ticket packages has developed into a time consuming task which generally falls outside the job description of most employees, and is generally performed at a less than adequate level. The failure to diligently monitor ticket availability often results in tickets going unused. The failure to properly record guests and business purposes accomplished by attending specific events prevents subsequent review/evaluation of ticket package utilization, and may result in negative ramifications from an income tax standpoint should deduction of ticket and entertainment expenses be called into question. Also, the failure to properly allocate ticket and associated expenses between departments is a cause for intra-company conflict. All of these negative factors conspire to reduce the desirability of purchasing season or multiple event ticket packages, and may ultimately result in cancellation or non-renewal of such season or multiple event ticket packages.

Therefore, there exists a need in the art for a device and method which eases the burdens placed upon ticket administrators. There also exists a need in the art for a device and method to properly track ticket usage and availability, and for allocating ticket and associated expenses between departments.

SUMMARY OF THE INVENTION

The present invention is directed toward a computer process for easing the burdens placed upon administrators of season ticket or multiple event ticket packages. The present invention is also directed toward a computer process for properly tracking ticket usage and availability, and for allocating ticket and associated expenses for billing purposes. The computer process according to the present invention is adapted to reside on a stand-alone computer, a server or local area network, or accessed via an intranet/internet connection. The computer process according to the present invention is further adapted to load from a floppy or compact disc, or to be downloaded via on-line access, such as may be provided by an internet site.

The present invention provides a WINDOWS™ environment computer process that tracks ticket usage and availability and allows for customized usage reporting. The computer process or software according to the present invention is customized for major market sports and non-sports season ticket packages and is further customized during installation on a computer in response to user-supplied information.

The computer process according to the present invention works with industry standard DOS file formats, and utilizes standard and accepted WINDOWS™ functions such as mouse-driven interfaces and drop down menus. The computer process is designed to support multiple users on a server or network system or via an on-line connection, as well as stand-alone personal computers.

The computer process according to the present invention permits easy management of season ticket packages for a ticket administrator. The present invention permits the ticket administrator to move between various display screens or levels showing relatively more or less information about the ticket package and specific events. One general display screen or level, which is referred to as a ticket manager screen, is integrated for all ticket packages being administered, and presents the schedule with events color-coded to show ticket availability. The codes for home games may provide information such as whether tickets are available, partially available, reserved, or not available. The ticket manager screen can be viewed in a full-season calendar format, a monthly calendar format, or in a scrolling list format.

The computer process according to the present invention also provides an event detail screen wherein details of interest relating to the event in question are provided. Such details include the host ticket user scheduled to attend the event or game, the guest ticket user(s) who will be entertained at the game, and the business purpose to be accomplished by hosting the guest. Other details which may be accessed from the event detail screen include queue or waiting list information relating to ticket requests.

The computer process according to the present invention also provides report formats which support user queries of the schedule to search for available events by specific opponent teams, days of the week, or periods of time; user queries of past or future events or games to search for attendance by specific ticket users (i.e., hosts or guests); a summary of ticket usage by hosts, guests, specific department or billing location; a summary of associated entertainment expenses reported by the host ticket users; and a report allocating ticket expenses to specific departments or billing locations based upon usage.

The computer process according to the present invention provides full viewing access to all authorized users, but limits certain functions to the ticket administrator, who will have a password. The computer process according to the present invention permits the user to order the purchase of additional tickets, which may be necessary when tickets are not available, or when a sufficient number of tickets for a particular event are not available. The computer process according to the present invention also maintains a database of ticket users (hosts and guests), and the database is accessed and utilized for report generation purposes. The database of ticket users is shared insofar as different versions of the present computer process, i.e., different seasons/years/sports teams, will have a common database.

The computer process according to the present invention includes a plurality of advertisement or team/event specific logos. The team/event specific logos will be static, while the advertisements will rotate periodically. It is contemplated that at least some of the advertisements will be season or date specific, such that a continuous evolution of the advertisement is produced during the progress of a season.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Generally, the present invention provides an interactive process for tracking, distributing, and record retention relating to season or multiple event ticket packages. The present invention also provides an interface which works in conjunction with a preloaded computer program, the computer program including a predetermined set of information regarding the scheduled events to which tickets are available, and the various ticket packages that are potentially available. The predetermined set of information will vary by sports team, orchestra, or theater group. For example, season or multiple ticket packages for a sports team would have a predetermined set of information which include a data base of game date, opponent, starting time, and special promotions, if any, for each event. The ticket packages could be full season, partial season, weekend plans, or the like. The predetermined information is preferably displayed for users on a ticket manager screen in a scrolling list format or a calendar format. Each format permits the user to easily view the entire season schedule, or a portion thereof, in a convenient color-coded display, as will be apparent from the discussion to follow.

Other predetermined information to be included in the preloaded computer program includes team, orchestra, or theater group specific art work and logos, and sponsor-specific information, art work, and/or advertisements that will be visible on one or more of the various display screens. As will be described more fully hereinafter, it is preferable that at least one of the advertisements will change periodically, i.e., every 15–30 seconds, and will be in a continuous loop such that the various advertisements are viewed in sequence. In this regard, it is contemplated that at least one of the changing advertisements in the sequence of advertisements will vary on given dates or at specific points during the season. Varying at least one of the advertisements will provide that advertising program with some seasonal/timing impact marketing, and may be part of a more diverse, coordinated multi-media advertising program.

The above-described predetermined information will be static, i.e., will not be changed by the various data input by the user. However, the calendar of event dates will graphically vary to readily indicate ticket availability and as-necessary in response to the addition of further games or event dates, i.e., for rescheduled or playoff games, and as will be described hereinafter.

Figure 1:
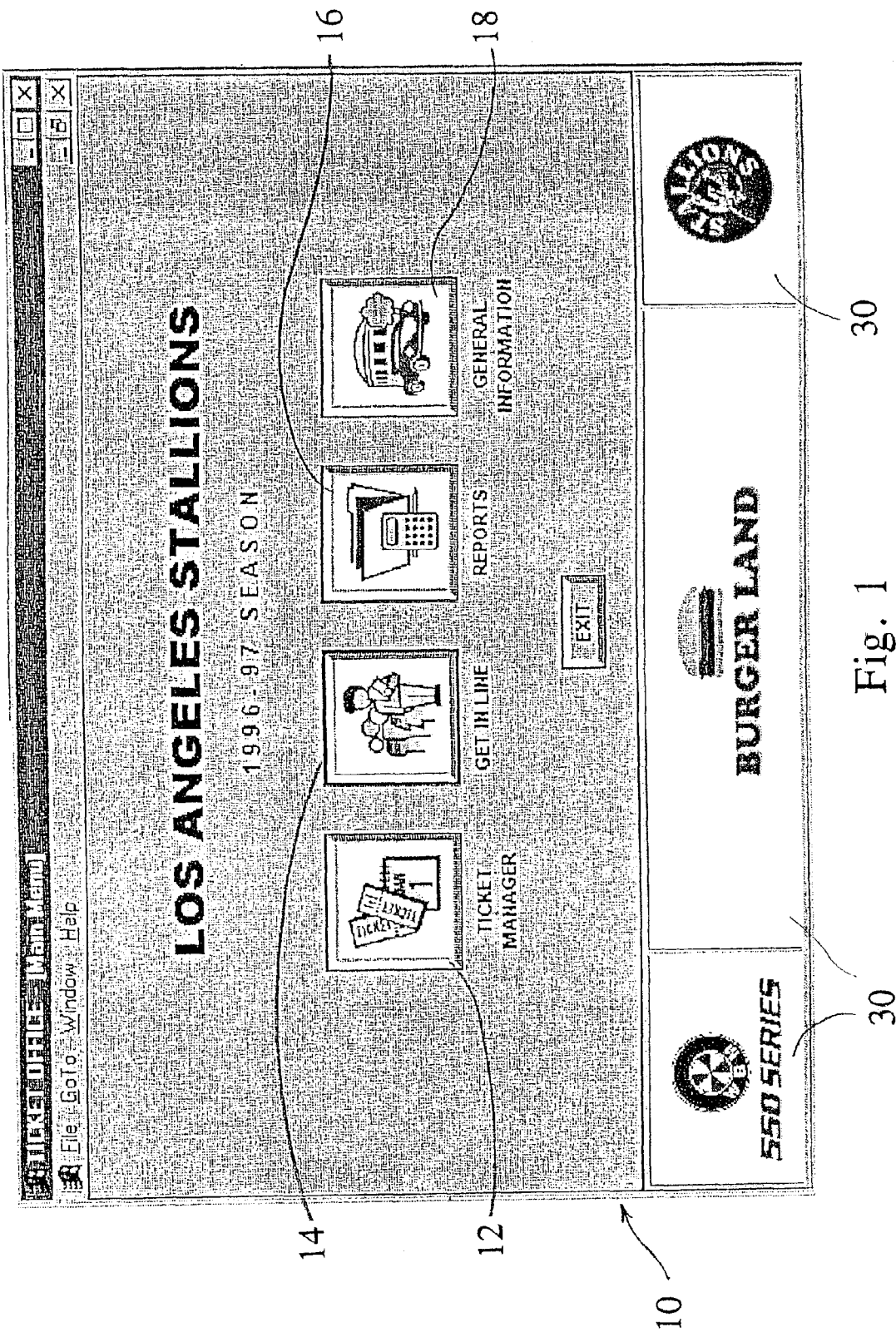
FIG. 1 schematically illustrates a main menu screen according to the present invention.
Figure 6:
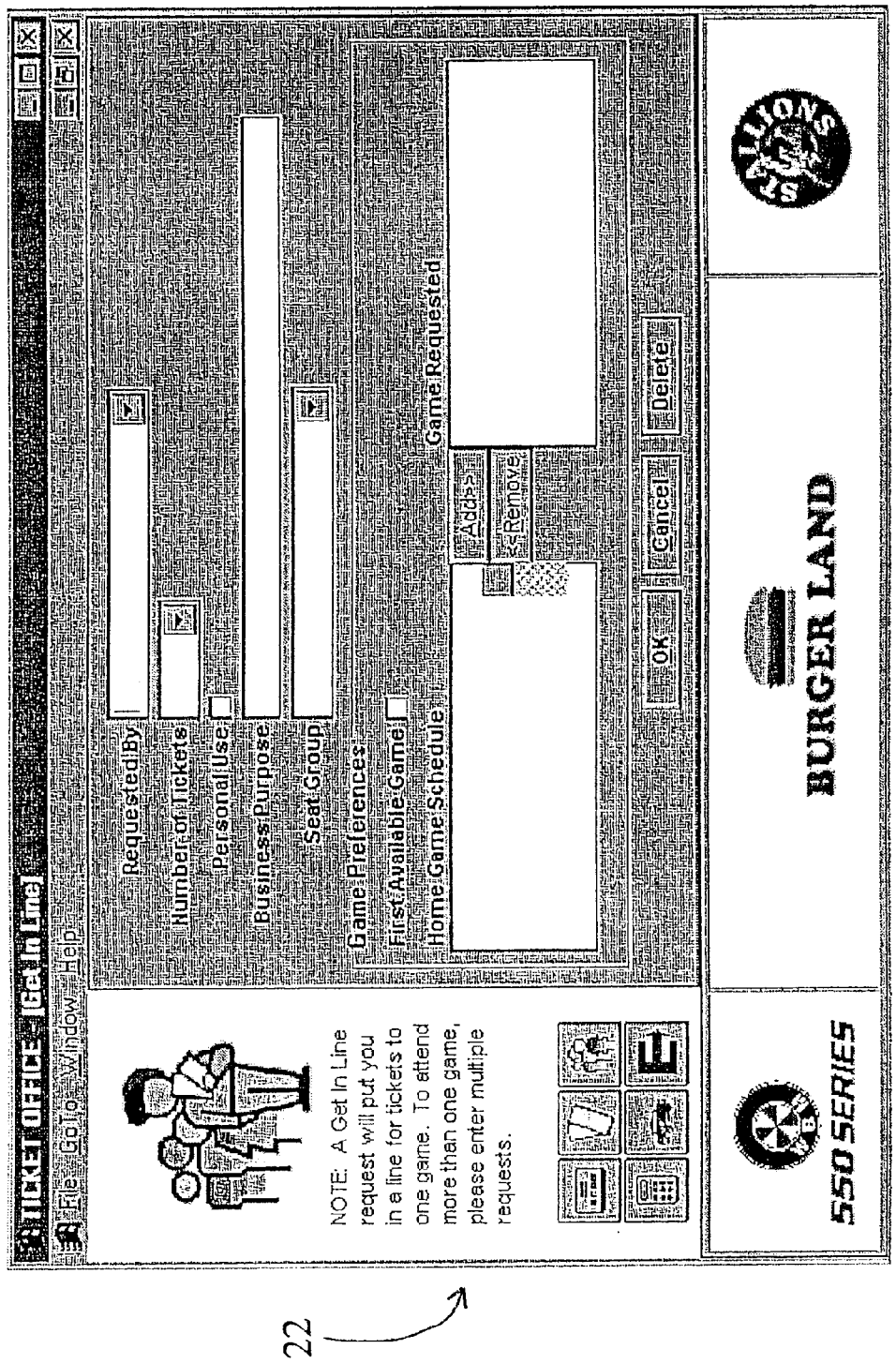
FIG. 6 schematically illustrates a get-in-line or queue screen according to the present invention.
Figure 7:
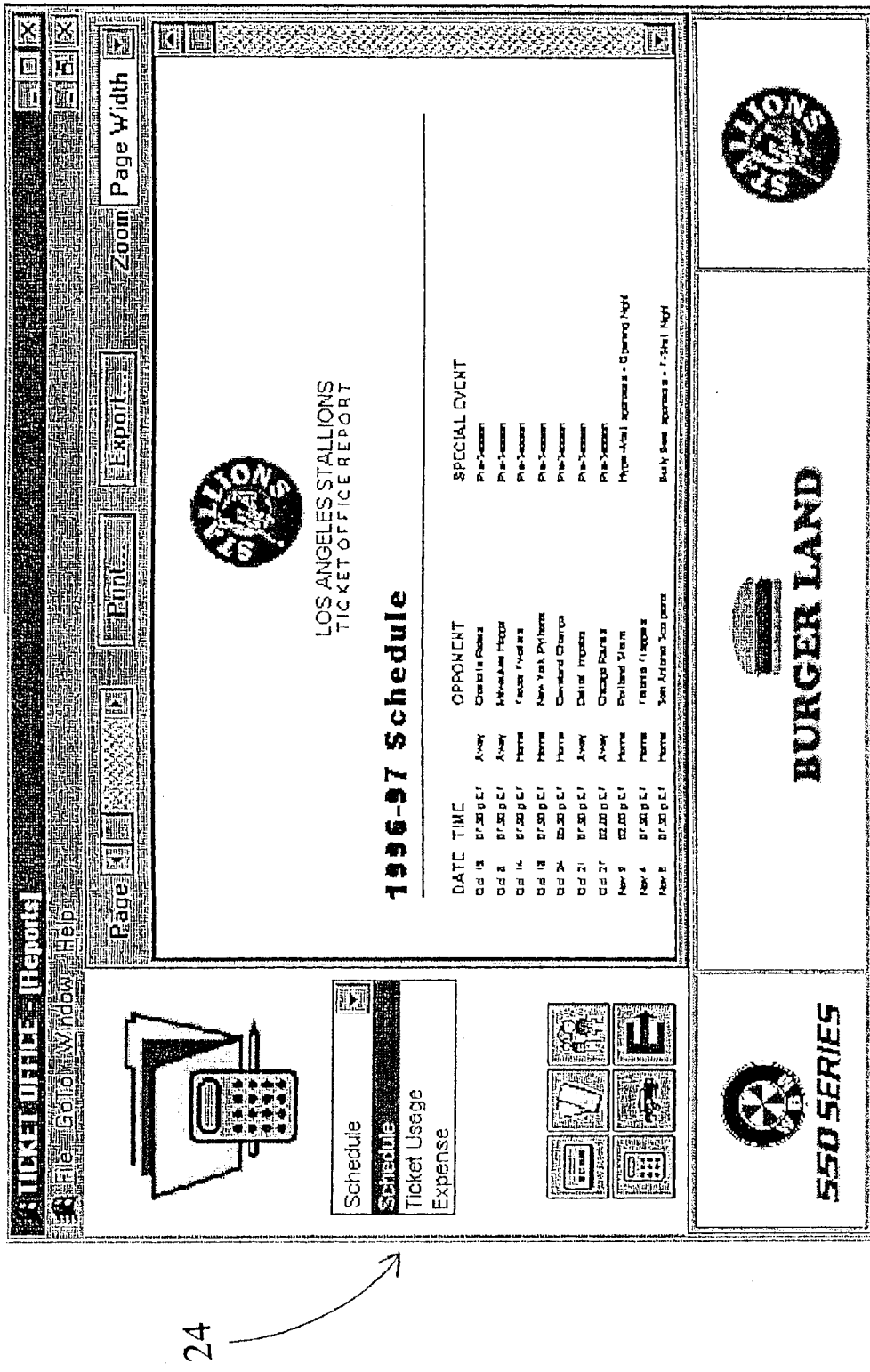
FIG. 7 schematically illustrates a reservation screen according to the present invention.
Figure 8:
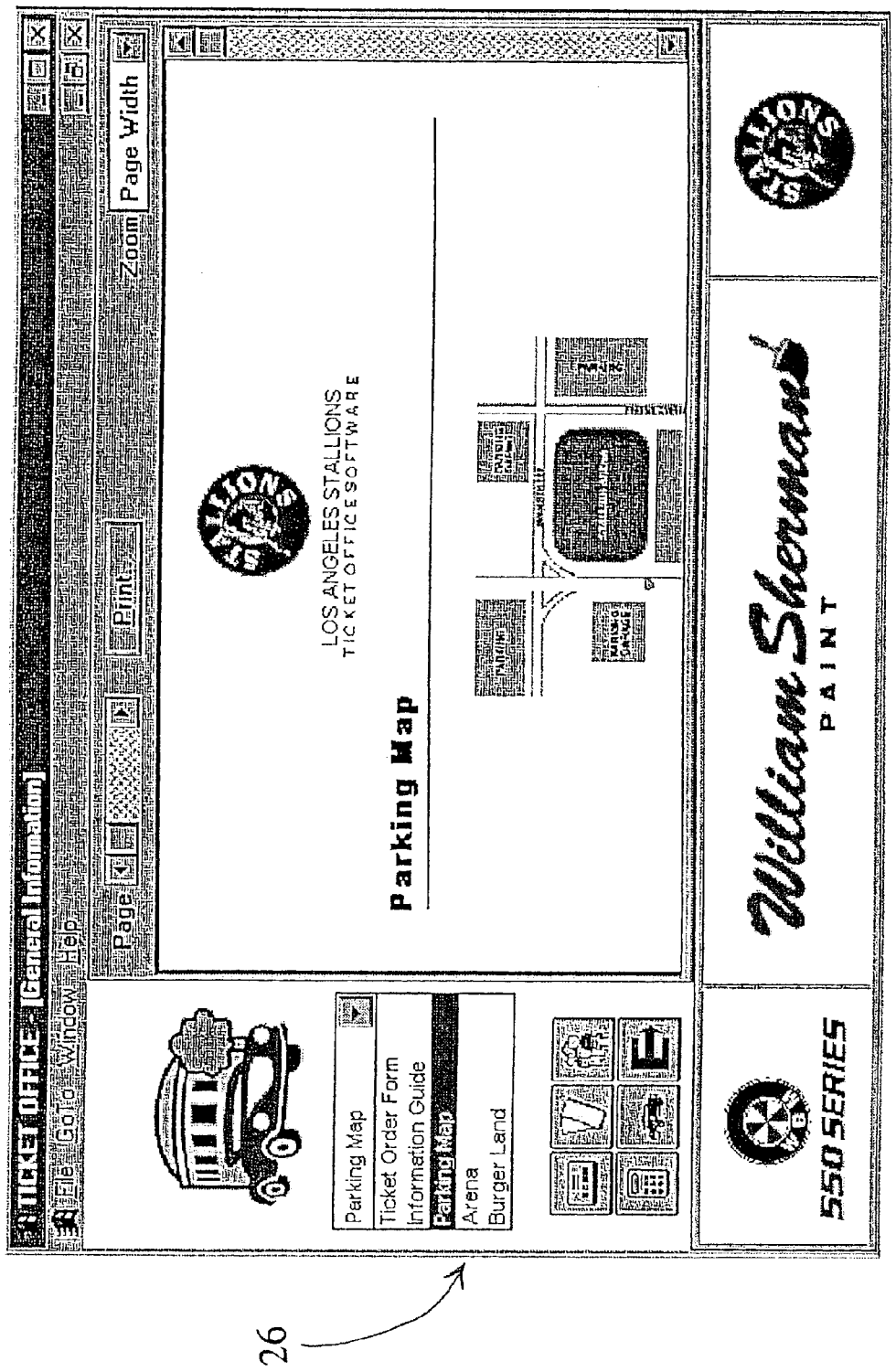
FIG. 8 schematically illustrates a general information screen according to the present invention.

With reference to FIG. 1, the main menu screen 10 preferably includes a ticket manager icon 12, a get-in-line icon 14, a report icon 16, and a general information icon 18. Clicking on the ticket manager icon 12 brings up a ticket manager screen 20 (FIGS. 3a–3d). Clicking on the get-in-line icon 14 brings up a get-in-line screen 22 (FIG. 6). Clicking on the report icon 16 brings up a report screen 24 (FIG. 7). Clicking on the general information icon 18 brings up a general information screen 26 (FIG. 8).

The main menu screen 10 and the other screens provided by the computer process according to the present invention also preferably include advertising or information blocks 30, and includes team or sponsor-specific logos or artwork. Preferably, the team logo block and a primary sponsor block are provided at lower corners of the display and are continuously displayed. A relatively large centrally-located sponsor block will periodically change, as described elsewhere herein, to show advertisements or information in a continuous, sequentially accessed loop. It is considered apparent that the illustrated logos or artwork are only representative of a generic-type logo/artwork that may be incorporated into the computer process according to the present invention, and in no way should be construed as limiting the present invention to any particular format or arrangement of design features.

As will be described more fully hereinafter, the information blocks 30 and other artwork are predetermined and static insofar as they not user accessible, as noted elsewhere herein. As shown on the drawing figures, the computer process according to the present invention displays various static logos, trademarks, and advertising (collectively called "artwork" hereinafter) together with user accessible and variable information. The artwork is preloaded and specific to a team, theater group, or orchestra and the sponsors associated therewith. The central block of sponsor artwork will preferably change periodically, i.e., will rotate, vary, or switch to another image at predetermined periods of time. As such, the artwork may simulate rotating advertising boards commonly seen in stadiums, ballparks, and indoor arenas.

The setup screen 32 (FIGS. 2a–2k) is also accessible from the main menu screen 10 and from the various other screens shown in FIGS. 3a–8 (by clicking on File) and includes a number of folders, including an administration folder 34, a ticket package folder 36, and a schedule folder 38.

The setup screen 32 and the various other screens also includes a block of icons which permit the user to switch to other portions or display screens of the computer process. Clicking on a main menu icon brings up the main menu screen 10 (FIG. 1); clicking on a ticket manager icon brings up the ticket manager screen (FIG. 3a); clicking on a get-in-line icon brings up a get-in-line screen (FIG. 4); clicking on a reports icon brings up the report screen (FIG. 7); clicking on a general information icon brings up the general information screen (FIG. 8); and clicking on an exit-back one screen icon takes the user back to the immediately previous screen. The block of icons is common to the various screens (FIGS. 3a–8), and helps the user in quickly navigating through the program.

The administration folder 34 (FIG. 2a) includes a ticket user directory icon 40, a configuration icon 42, a team maintenance icon 44, a company maintenance icon 46, and a department maintenance icon 48. As noted hereinbefore, access to the setup screen and the various folders therein is provided to all users, but the ability to change or input information is limited to the ticket administrator, and requires input and verification of the ticket administrator's password. If a non-ticket administrator attempts to change/add information in the setup, he/she will be prompted for the ticket administrator password before the changes will be accepted.

Figure 2A:
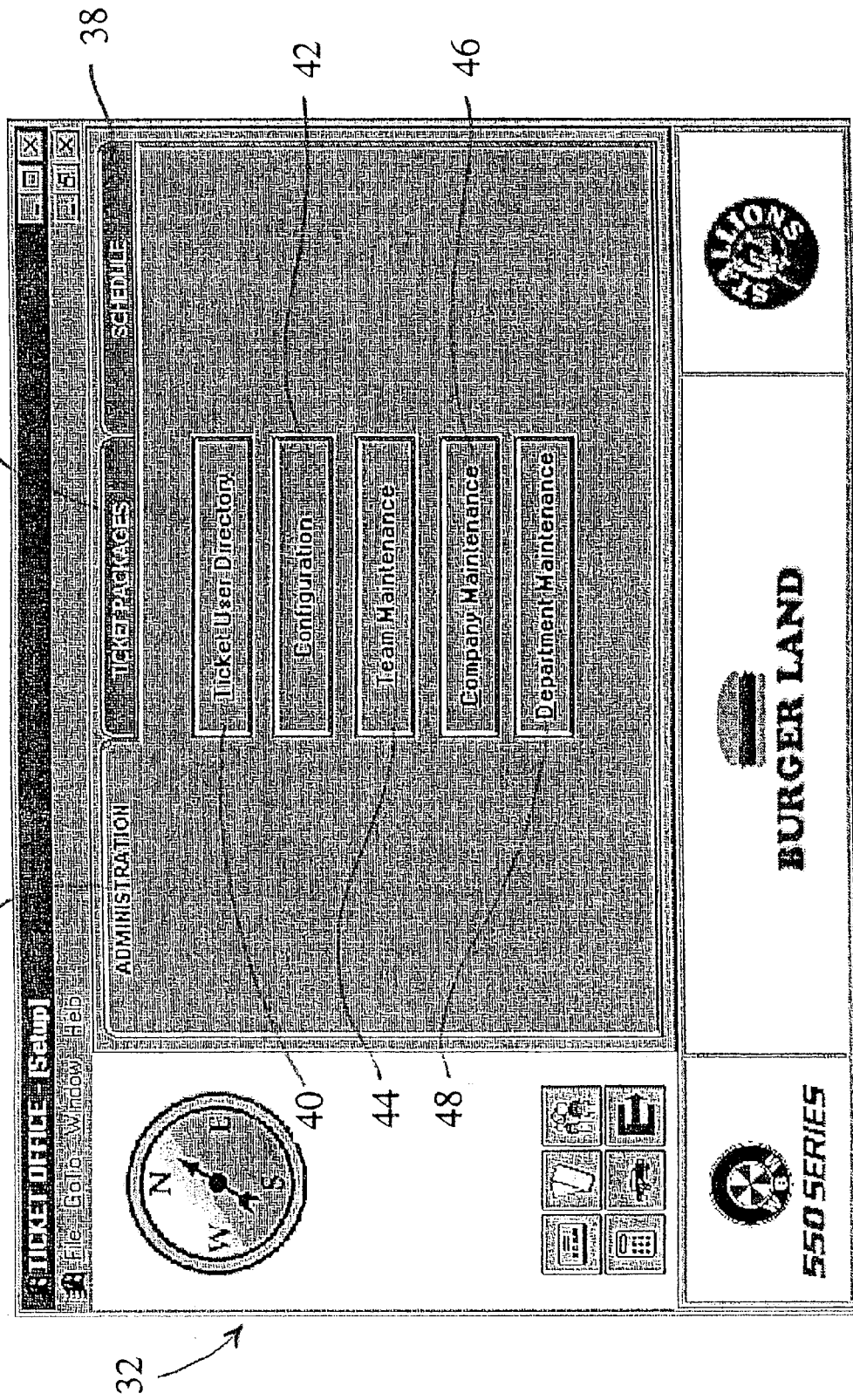
FIGS. 2a–2h, 2j, and 2k schematically illustrate various setup screens according to the present invention.
Figure 2B:
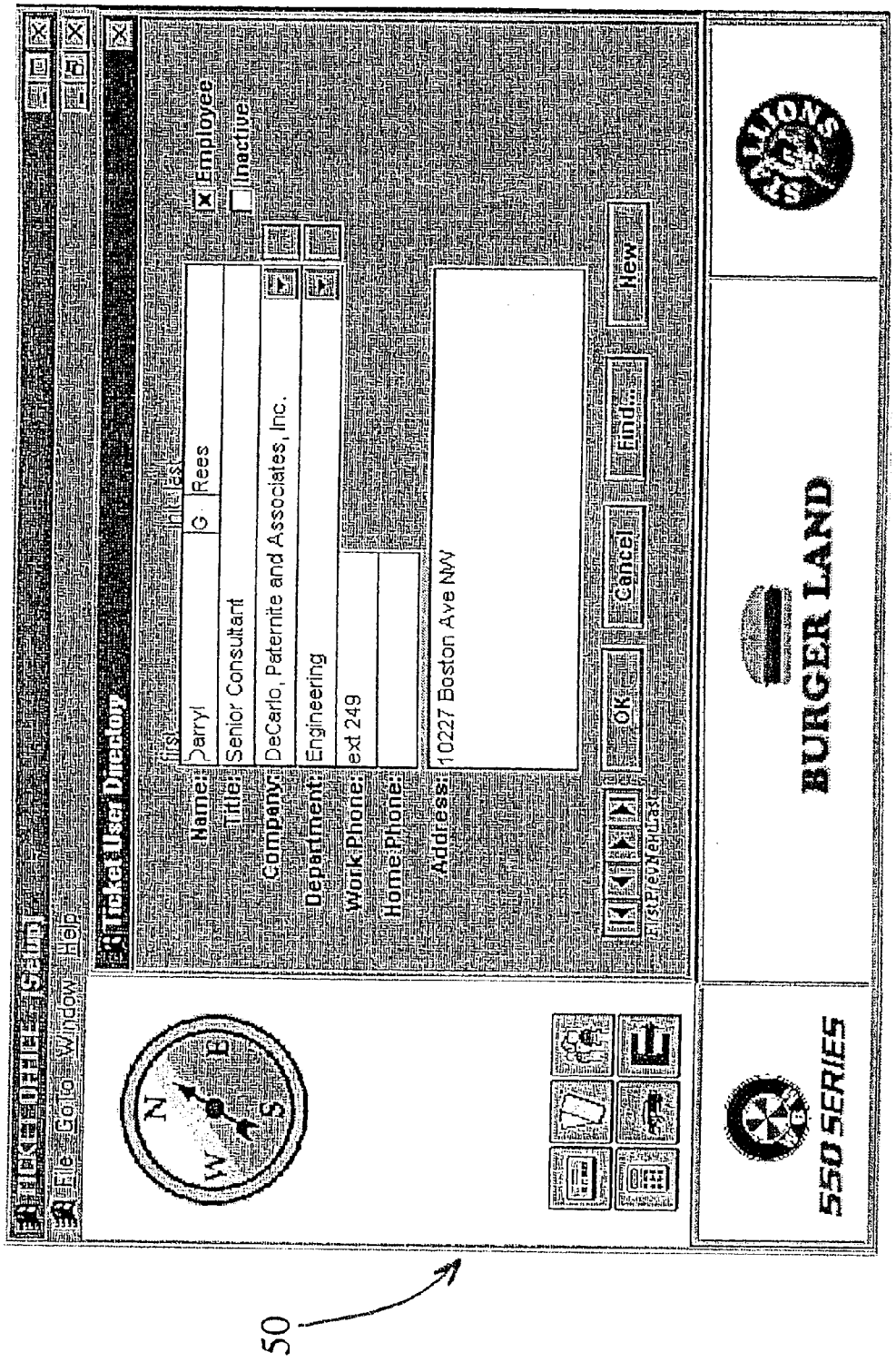
Figure 2C:
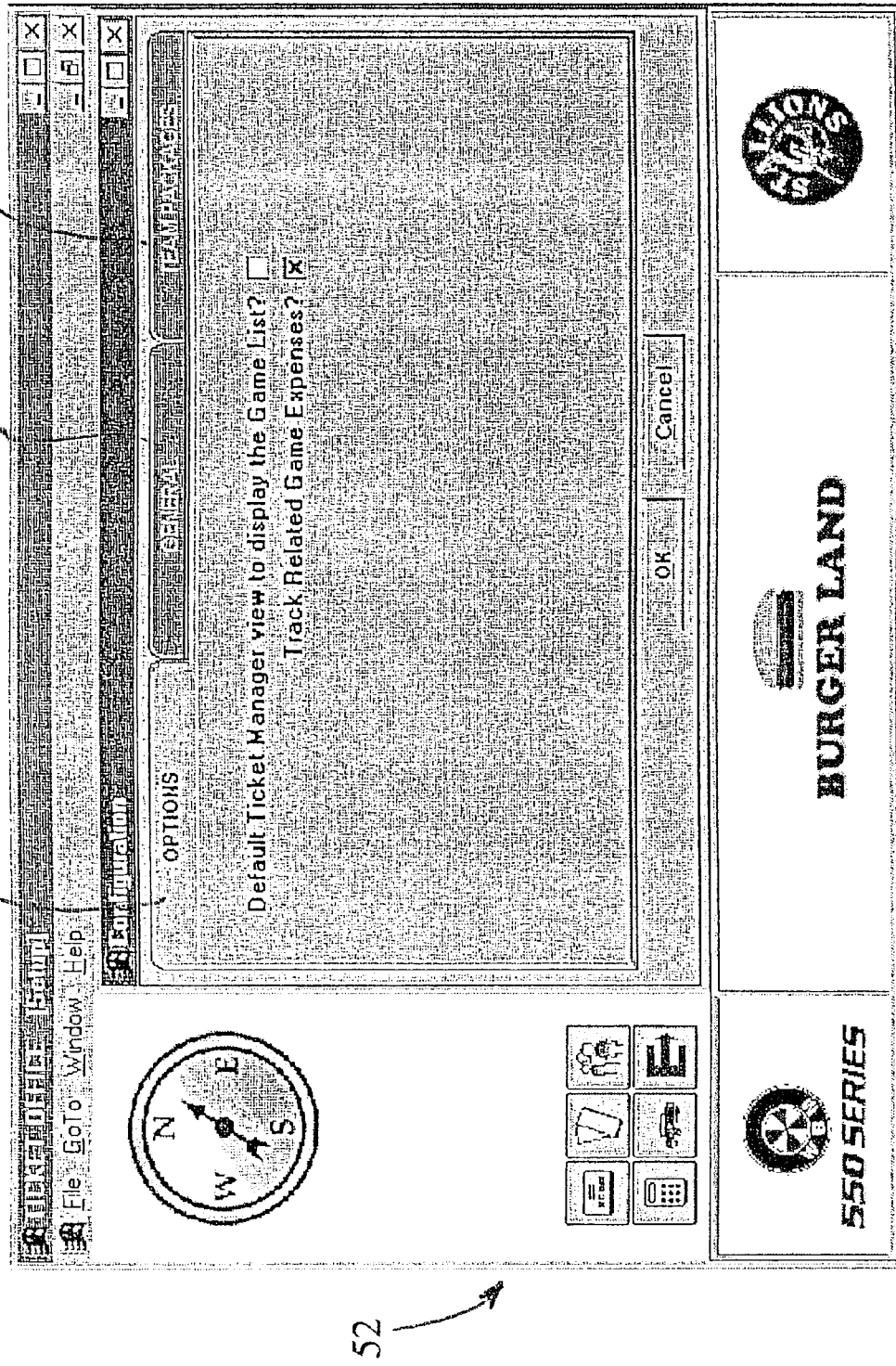
Figure 2D:
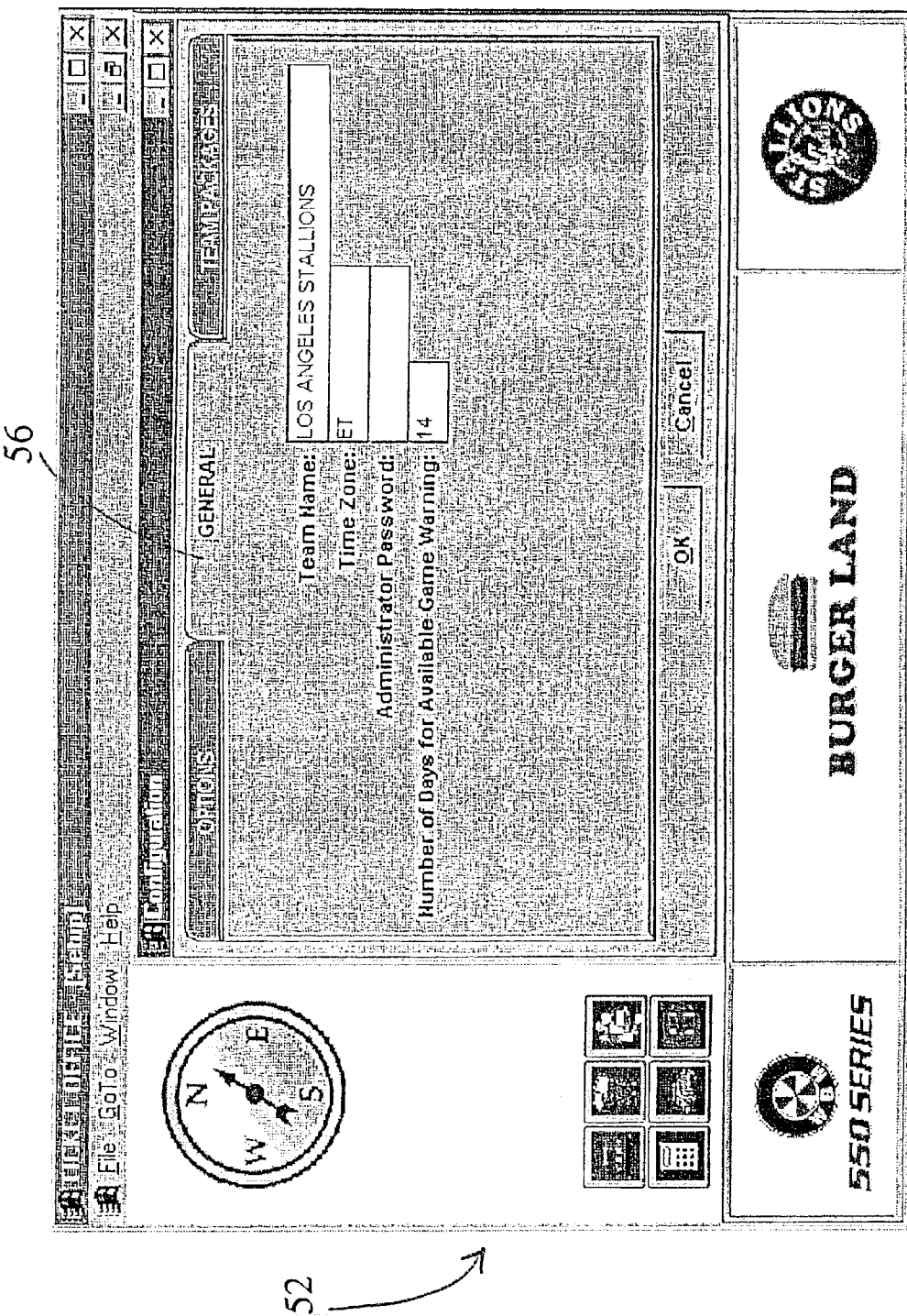
Figure 2E:
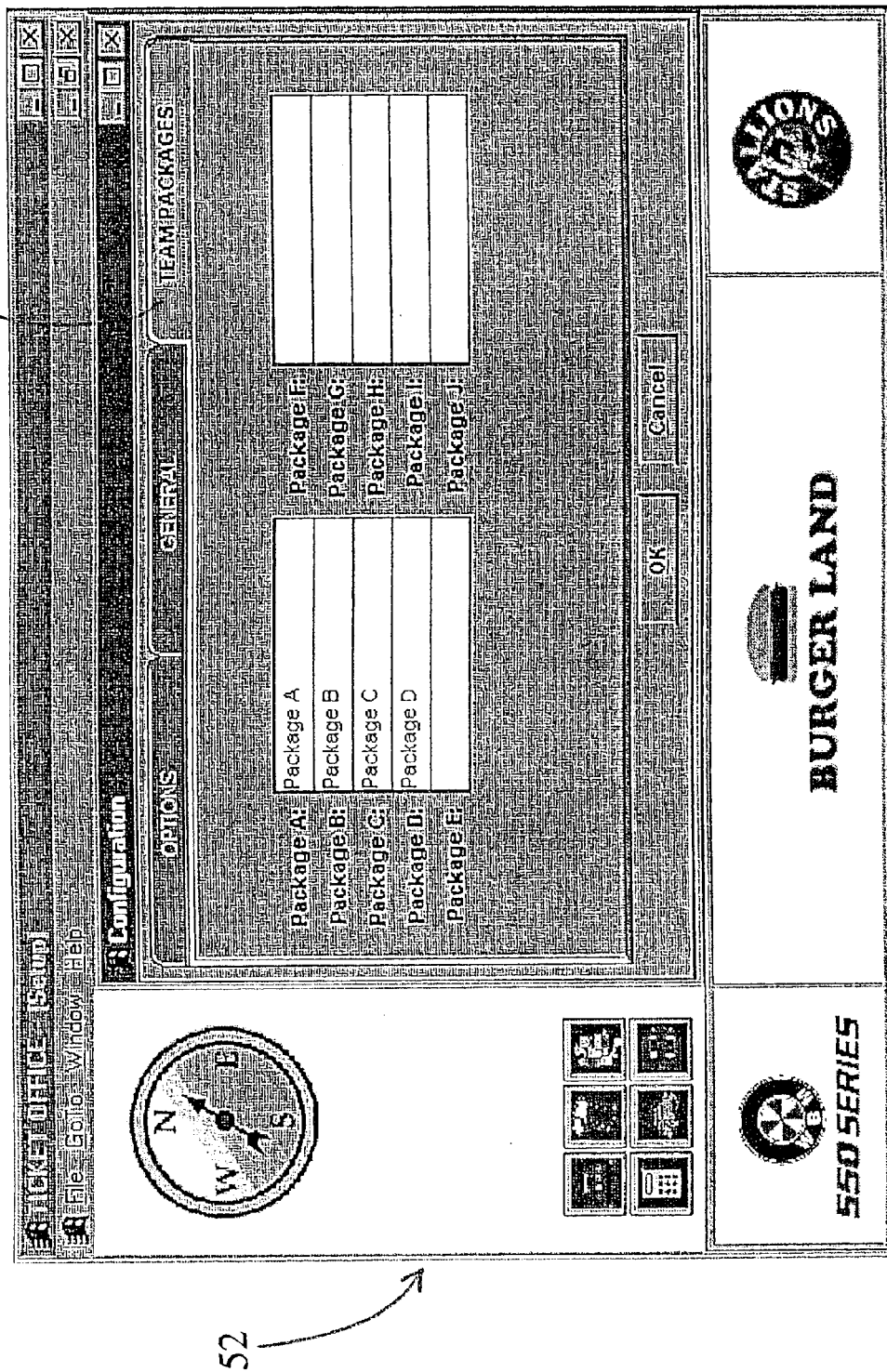

Clicking on the ticket user directory icon 40 brings up a ticket user directory screen 50 (FIG. 2b). The ticket user directory screen 50 allows the ticket administrator to input information regarding new ticket users, to update ticket user profiles, and permits all users to access ticket user information previously input and stored in the database. Any new ticket user information input at the ticket user directory screen 50 is added to the database. The ticket user information preferably includes the user's name, title, company affiliation, department, phone numbers and address, as illustrated in FIG. 2b. The ticket user's company and department are searchable to assist in inputting the desired user company/department information. The user can scroll through the ticket user directory screen, and can search the ticket user directory to quickly locate the desired user name. The current status of the ticket user as an employee/non-employee and active/inactive is indicated on the ticket user directory screen 50 and can be modified or updated by the ticket administrator. Only active employees are eligible to reserve tickets (get-in-line), and to order the purchase of additional tickets, as will be described hereinafter.

The configuration icon 42 brings up a configuration screen 52 (FIGS. 2c–2e) which includes a series of configuration folders, including an options folder 54, a general folder 56, and a team package folder 58.

The options folder 54 (FIG. 2c) allows the user to select between options, such as the default display of the ticket manager screen, and whether event-related expenses are to be tracked.

The general folder 56 (FIG. 2d) permits the user to input general information regarding the team or events to be tracked, such as the team name, time zone of the games, and number of days for available game warning. The warning will display, at start-up, upcoming games for which tickets are available to reduce the chance of tickets going unused. The ticket administrator is designated or selected in the general folder from the set of users (input via the ticket user directory screen) and the ticket administrator can select and change his/her password.

The team packages folder 58 (FIG. 2e) permits the user to input identifiers for the various ticket packages being tracked, such as full season, weekend, partial season. In the preferred embodiment of the present invention, ten ticket packages are able to be tracked. However, it should be clear that it is contemplated that more or less ticket packages may be tracked without departing from the scope of the present invention.

Figure 2F:
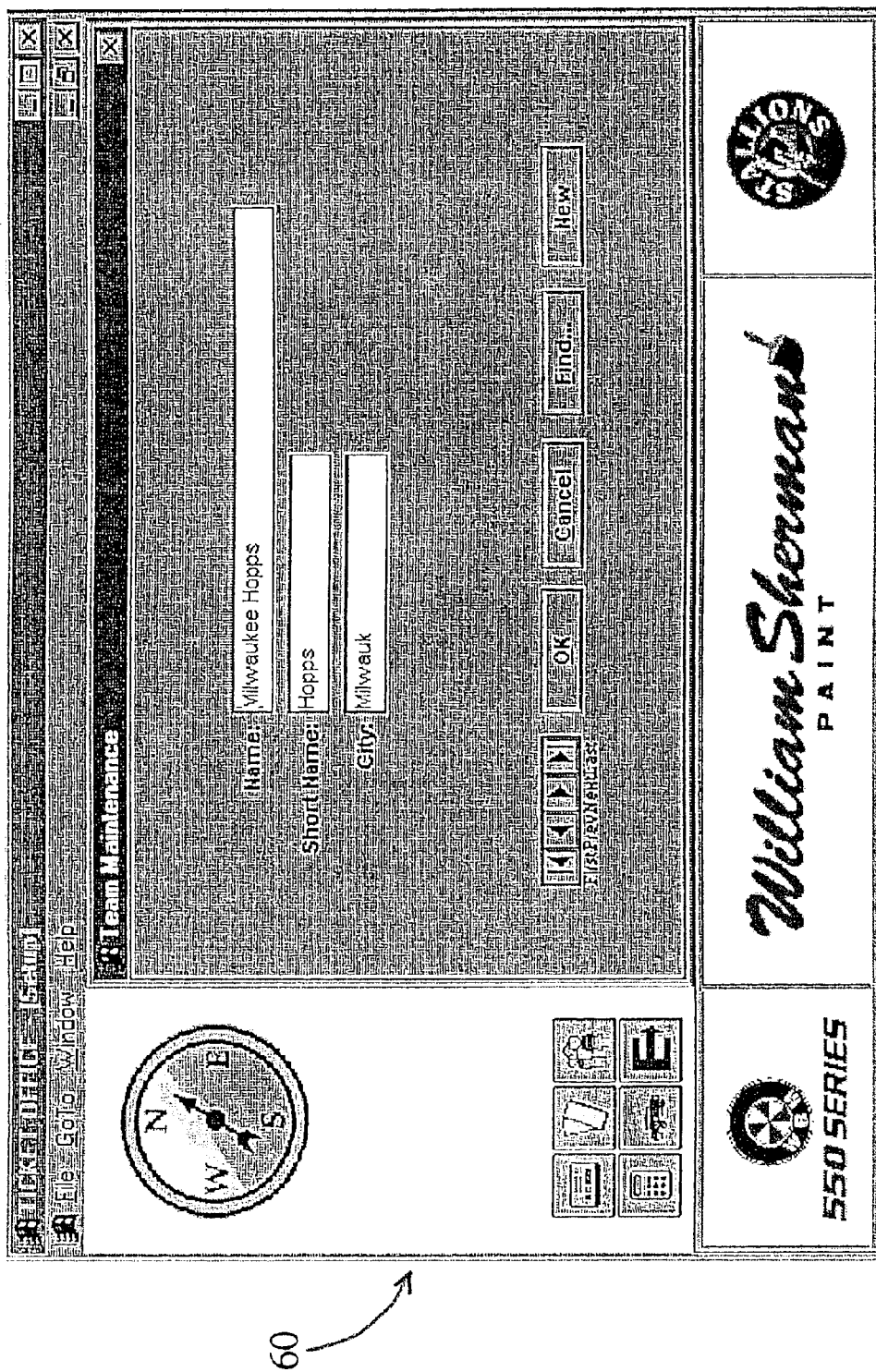

Clicking on the team maintenance icon 44 in the setup screen 32 (FIG. 2a) brings up a team maintenance screen 60 (FIG. 2f). The team maintenance screen permits the user to input information on the team or teams being tracked. This information may include the name, nickname or mascot, and city of the team or group being tracked. This information is stored in the database. The team maintenance screen also permits the user to search the database and access previously input data regarding teams or groups, as illustrated.

Figure 2G:
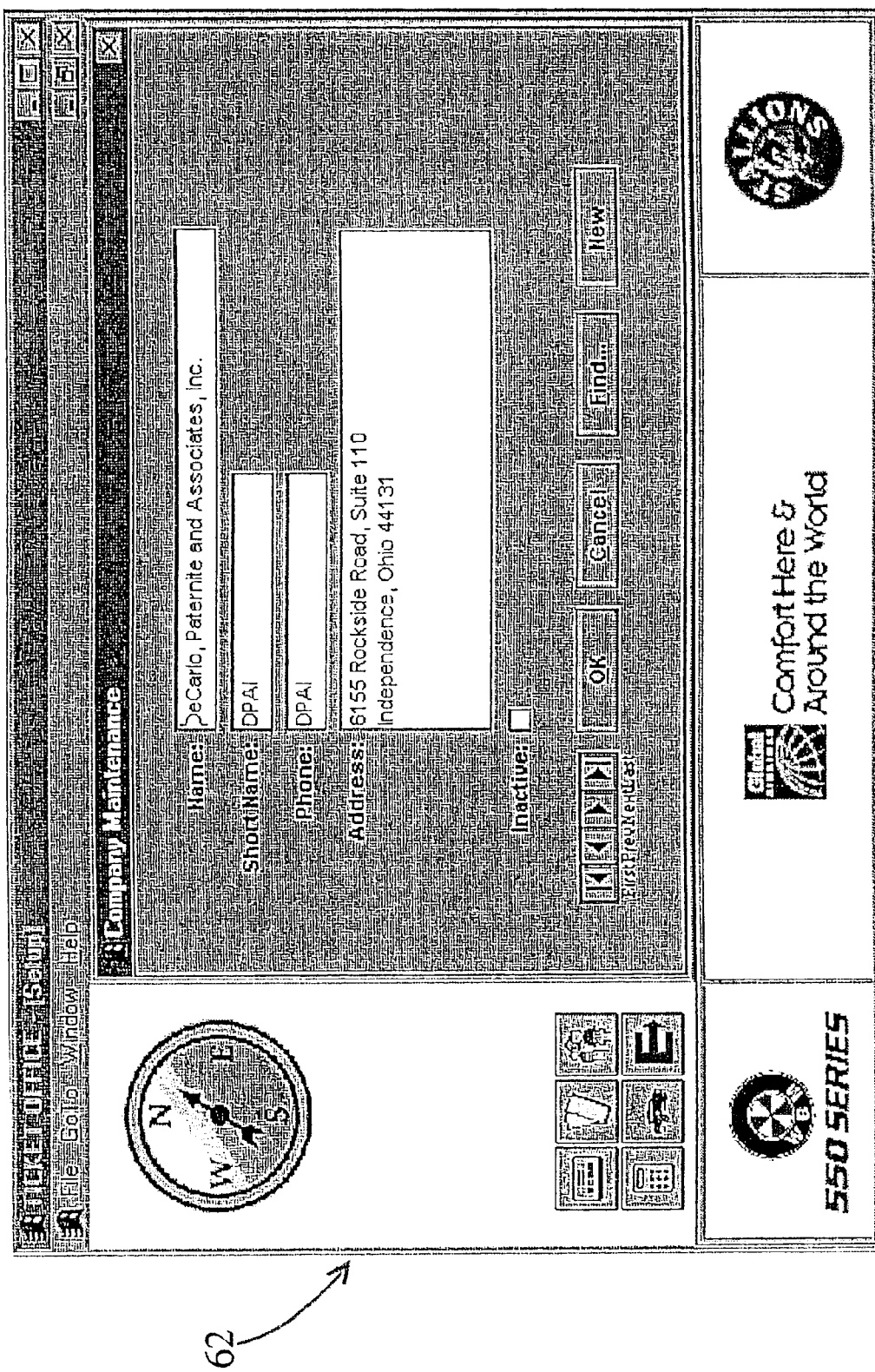

Clicking on the company maintenance icon 46 in the setup screen 32 (FIG. 2a) brings up a company maintenance screen 62 (FIG. 2g). The company maintenance screen 62 permits the user to input information on the ticket user's company, and to indicate the company status (active/inactive). Company information is stored in the database. The company maintenance screen also permits the user to search the database, and to access previously input data regarding the various company profiles stored in the database, as illustrated.

Figure 2H:
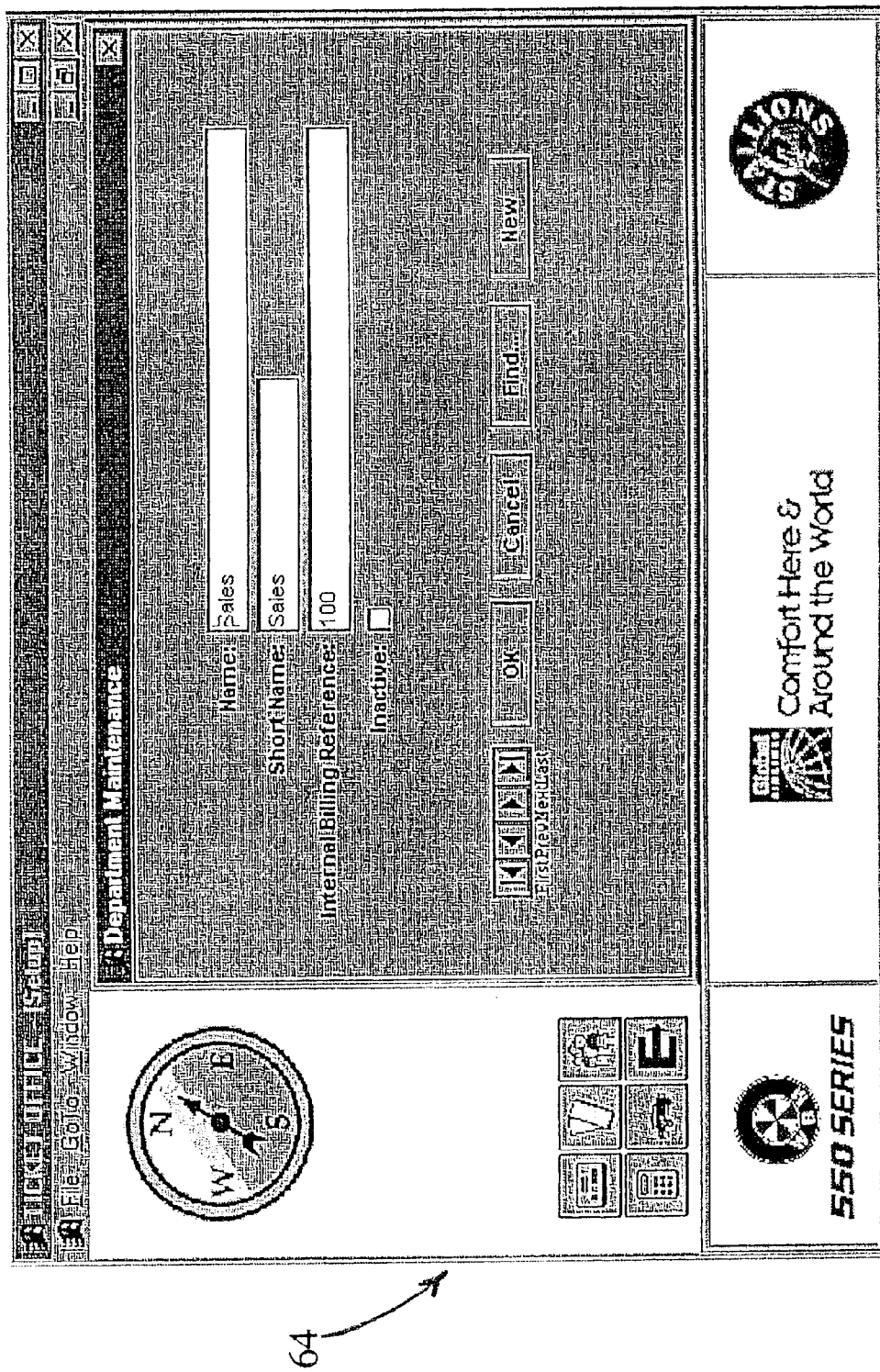

Clicking on the department maintenance icon 48 in the setup screen 32 (FIG. 2a) brings up a department maintenance screen 64 (FIG. 2h). The department maintenance screen permits the user to input information on the department for which tickets are being tracked, as may useful when the tickets are being used by plural departments within a company. Department information is stored in the database. The department maintenance screen also permits the user to search the database, and to access previously input data regarding the various department profiles stored in the database, as illustrated. The department's status (active/inactive) is indicated and modified by the ticket administrator. Only active departments are permitted to have tickets charged thereto. This is useful to prevent unauthorized charges against departments which do not ordinarily use tickets, or which do not have a proper business purpose for the use of tickets.

Figure 2J:
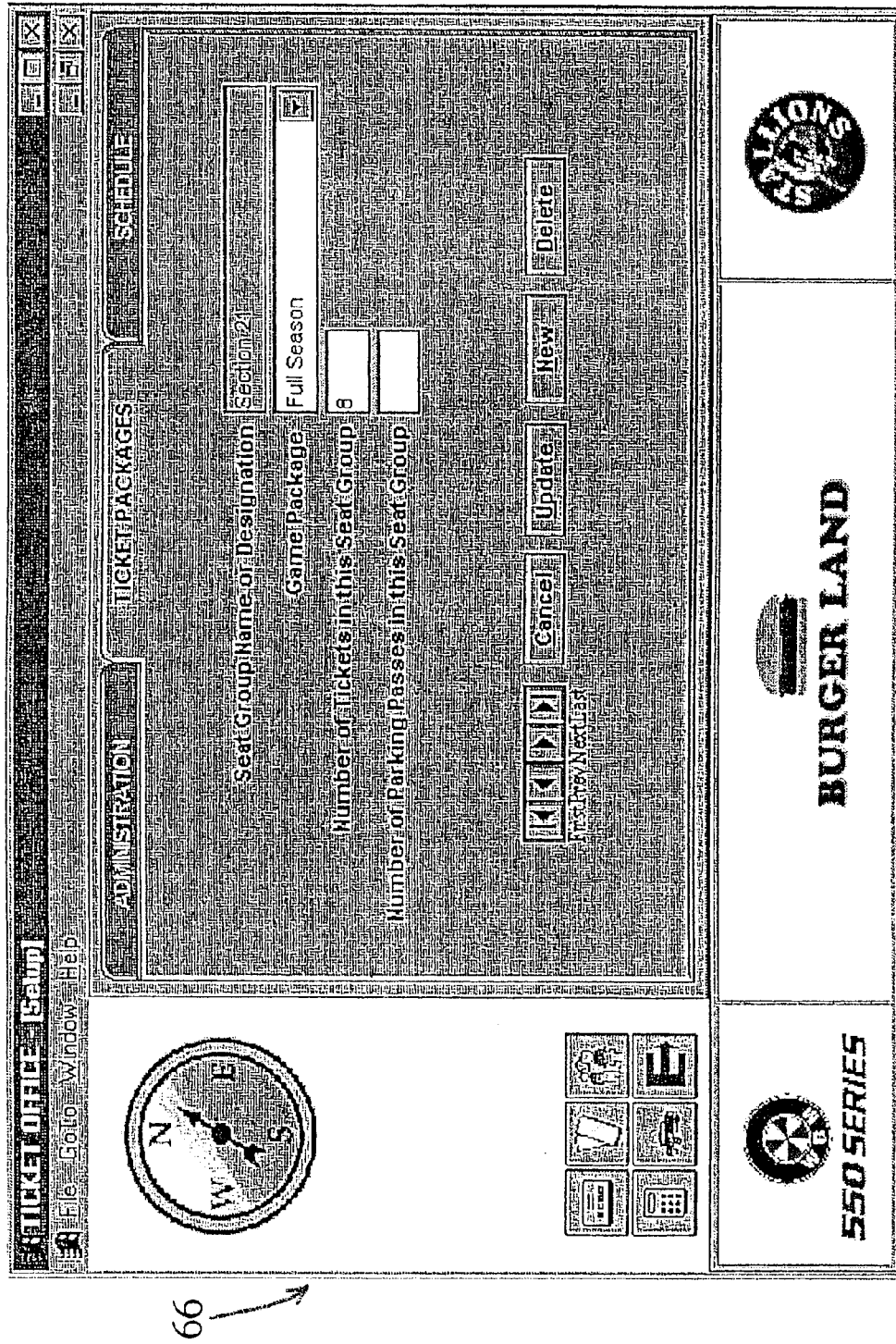

Clicking on the ticket packages folder 36 in the setup screen 32 (FIG. 2a) brings up a ticket package screen 66 (FIG. 2j). The ticket package screen 66 permits the user to input information regarding the seat group or location, to select the type of ticket package from a predetermined list of ticket packages (i.e., full season, weekend, partial season) such as named or identified in the team packages folder (FIG. 2e), to input the number of tickets in the seat group, and the number of parking passes to be linked with the seat group, if any. The games included in each type of season ticket package will be preloaded as part of the team specific database. The input information is stored in the database, the contents of which are accessible and searchable by the user, as illustrated.

Figure 2K:
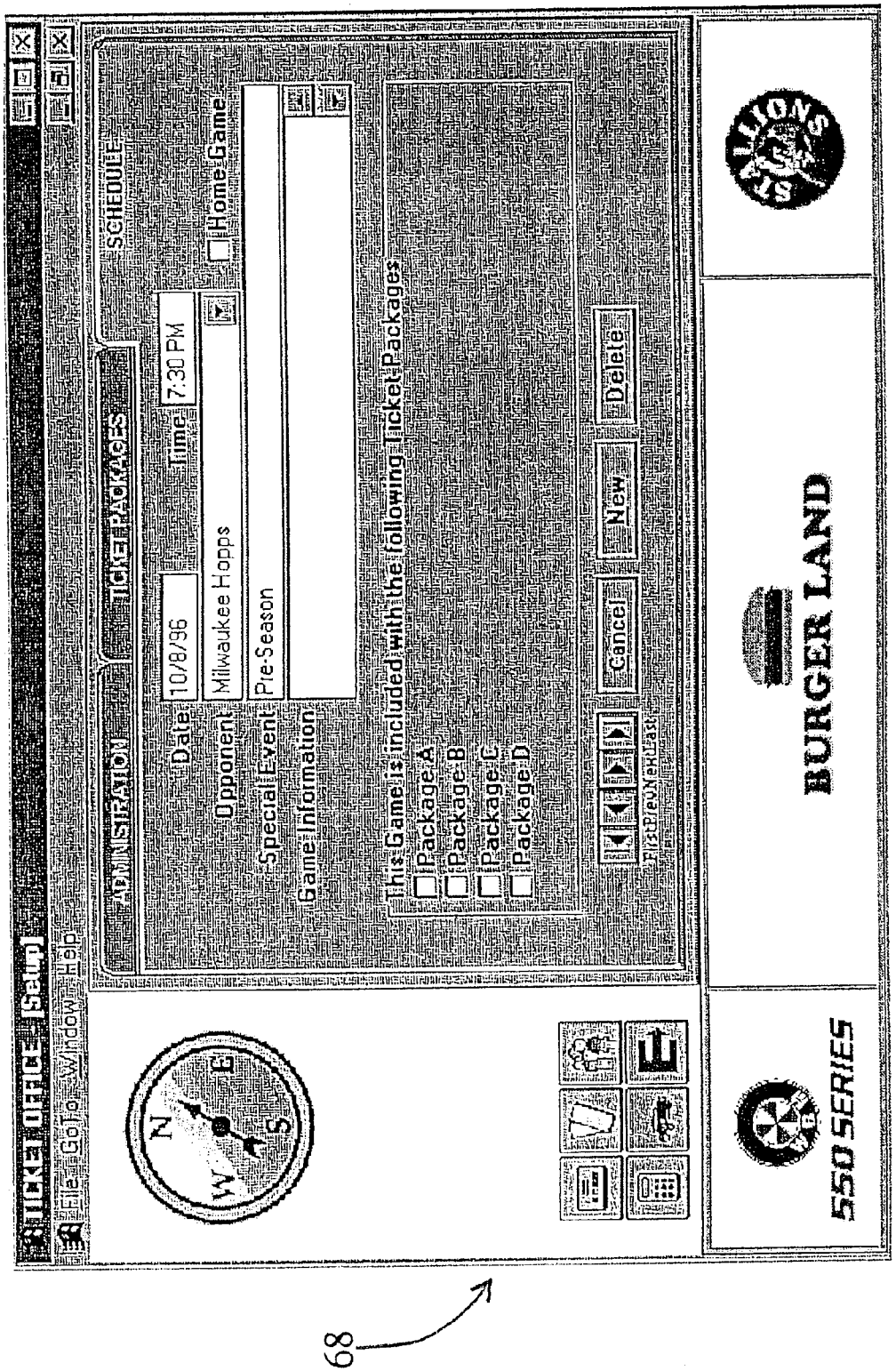

Clicking on the schedule folder 38 in the setup screen 32 (FIG. 2a) brings up a schedule screen 68 (FIG. 2k). As illustrated in FIG. 2k, the schedule screen 38 displays game-specific information, such as whether the game is home or away, whether the game is part of any of the various partial season ticket packages (it being understood that all games are included in the full season package), the game time, the opponent, and the special promotion, if any. At the schedule screen the ticket administrator can delete, add, or change games, as will be necessary for canceled, postponed, or rescheduled games (i.e., rain-outs) or subsequently purchased or added games (i.e., make-up games, playoff games, or games for which tickets have been purchased separate from any ticket package). The schedule folder indicates which ticket packages include the game or event in question.

Figure 3A:
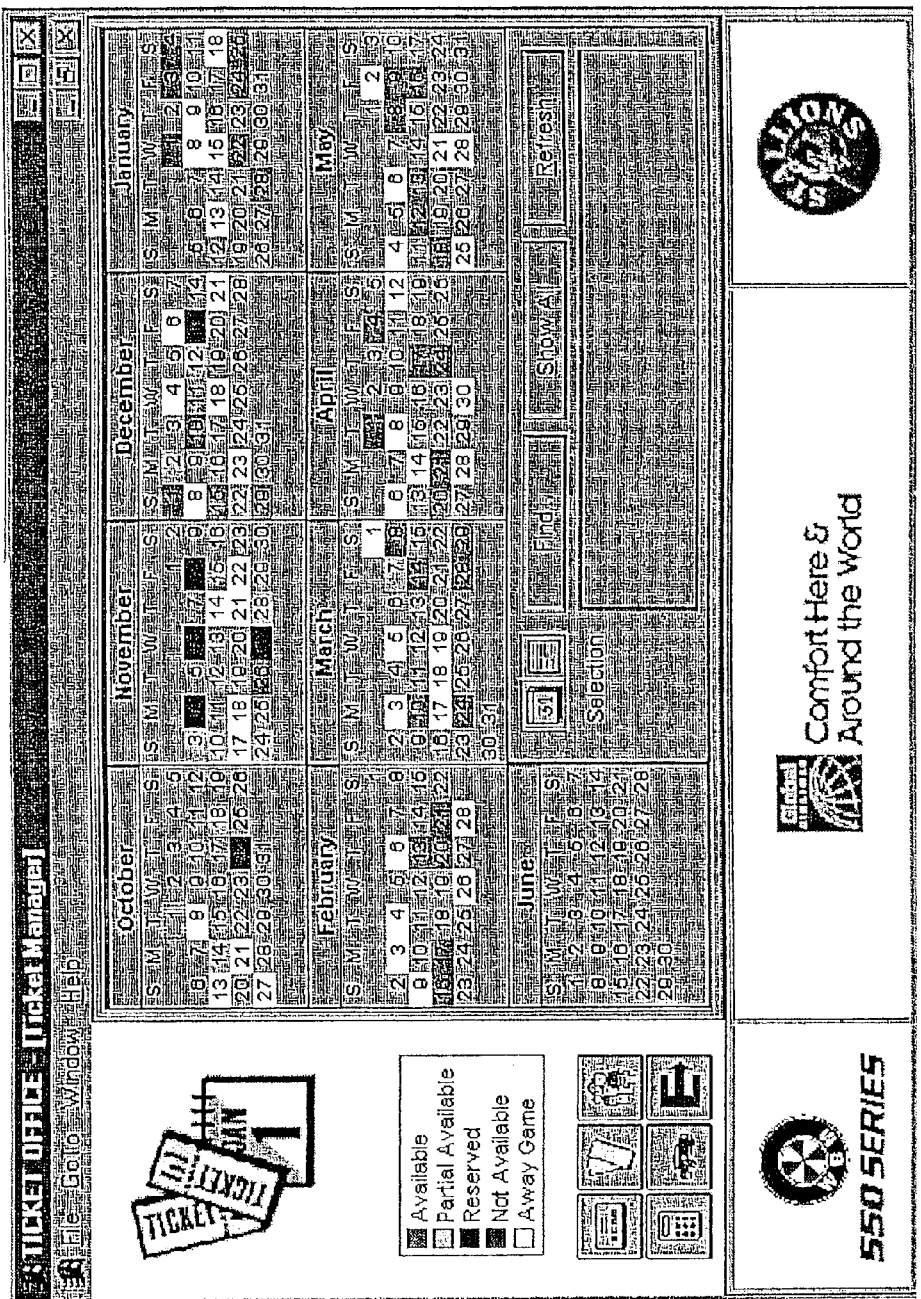
FIGS. 3a–3d schematically illustrate various ticket manager screens according to the present invention.
Figure 3B:
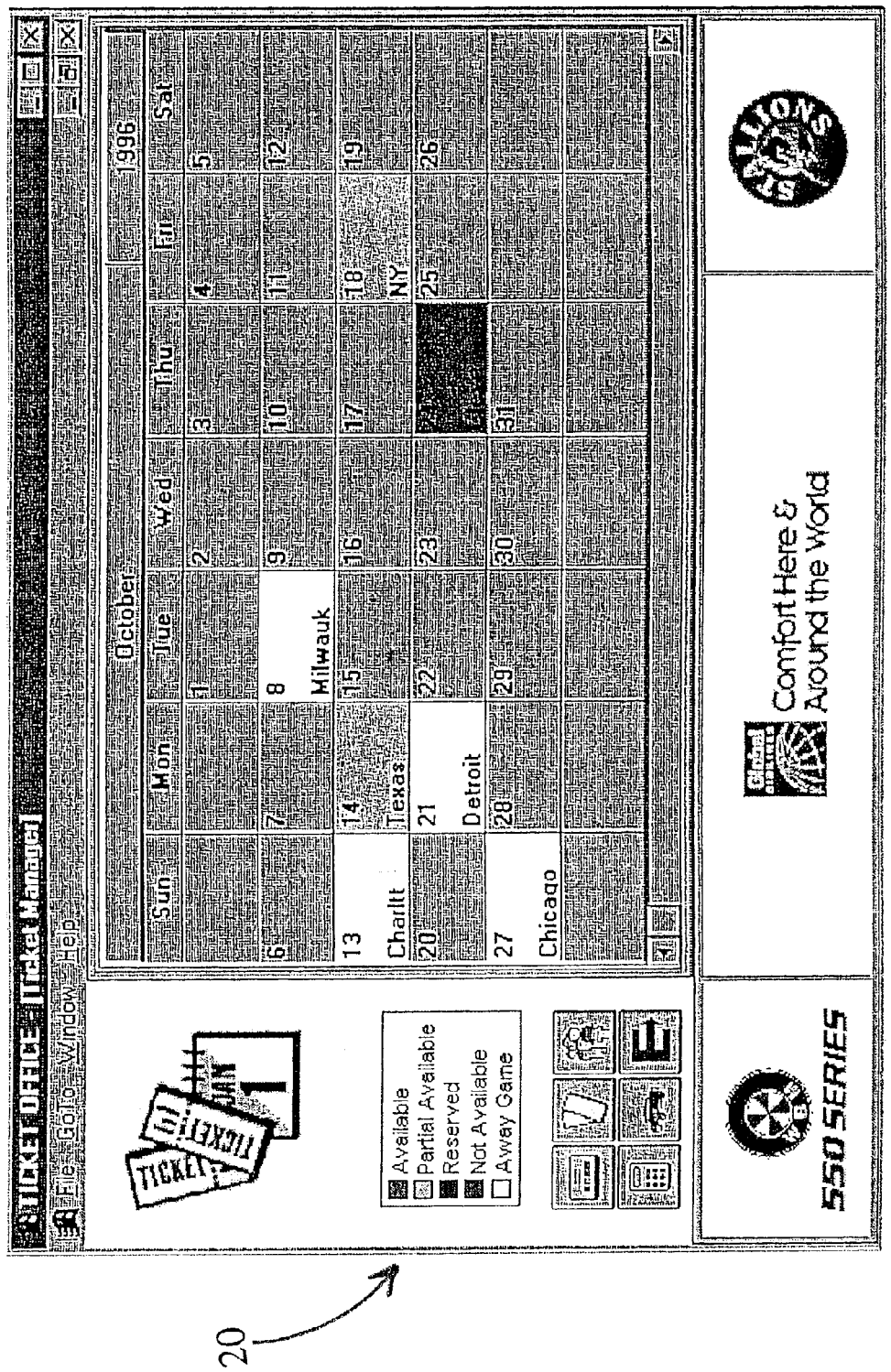
Figure 3C:
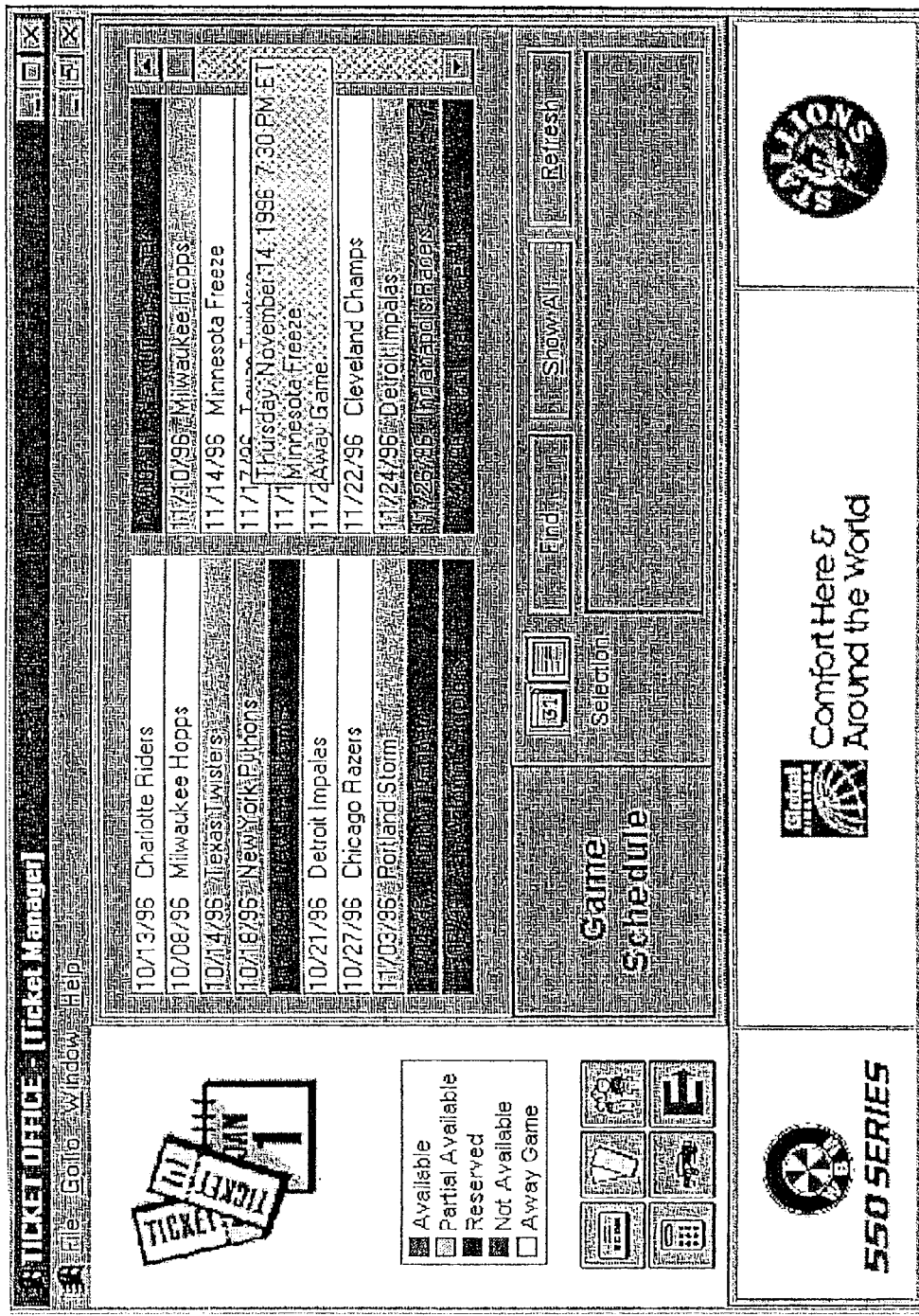
Figure 3D:
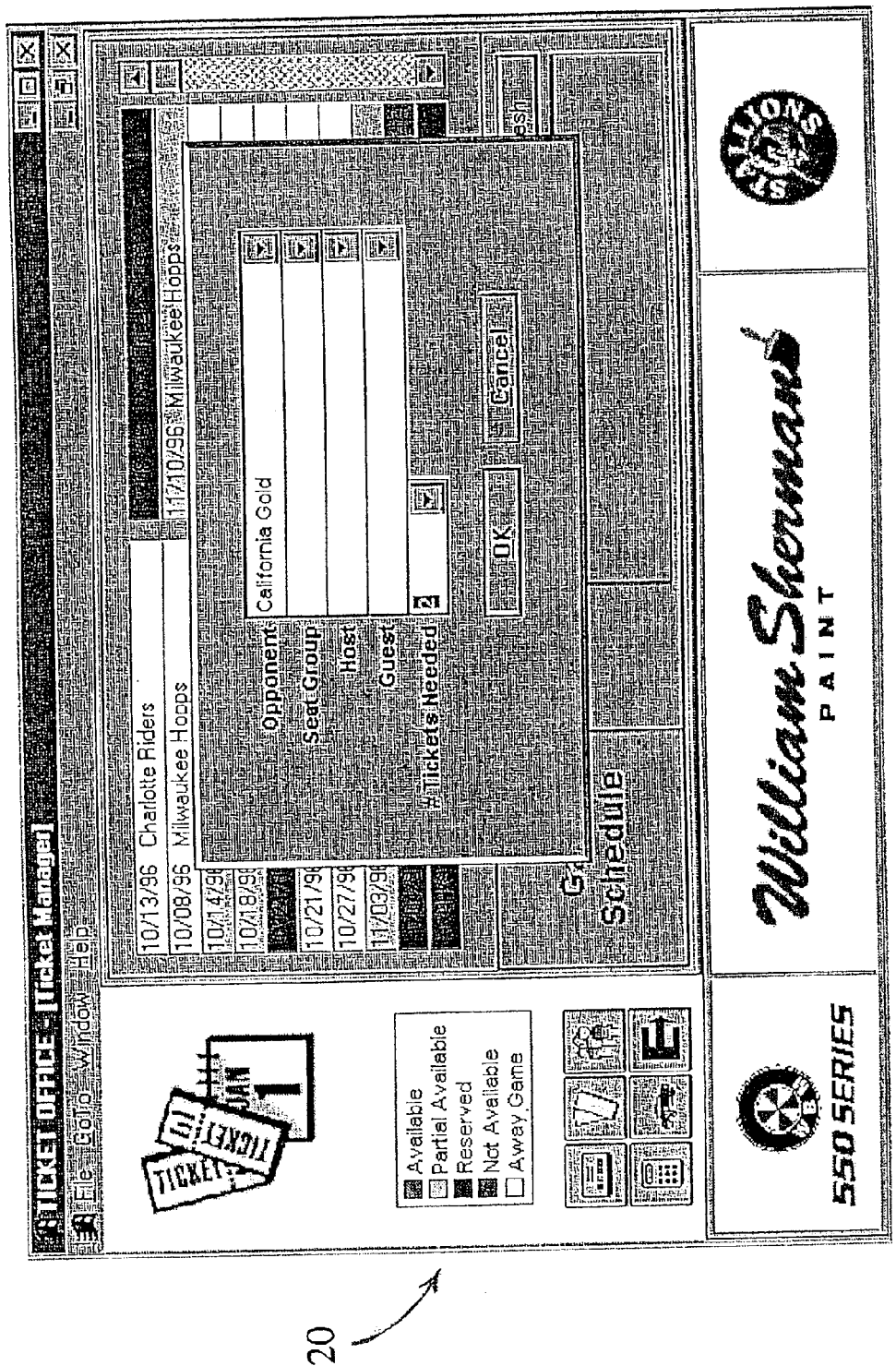
Figure 4A:
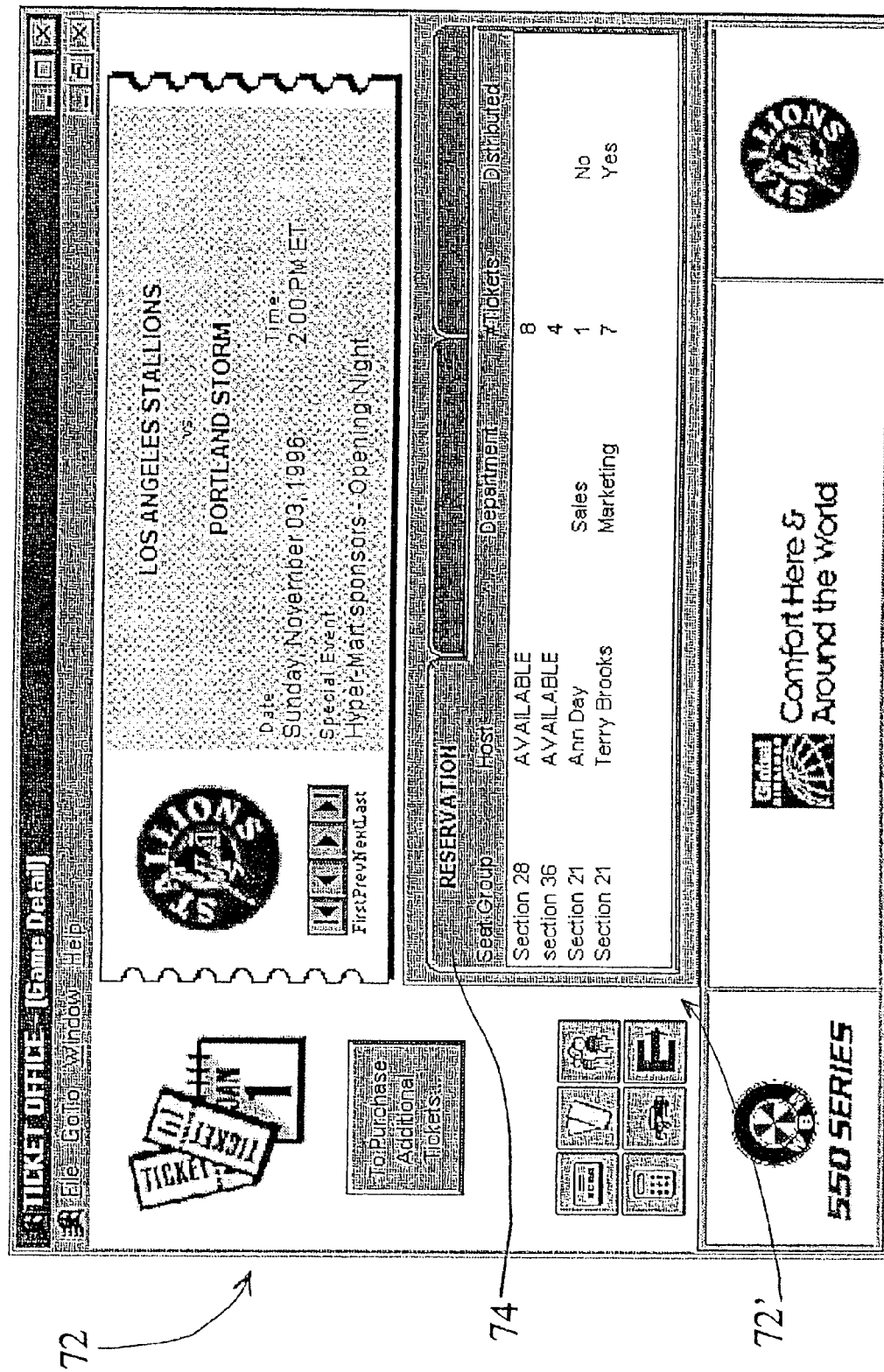
FIGS. 4a–4b schematically illustrate game detail screens according to the present invention.
Figure 4B:
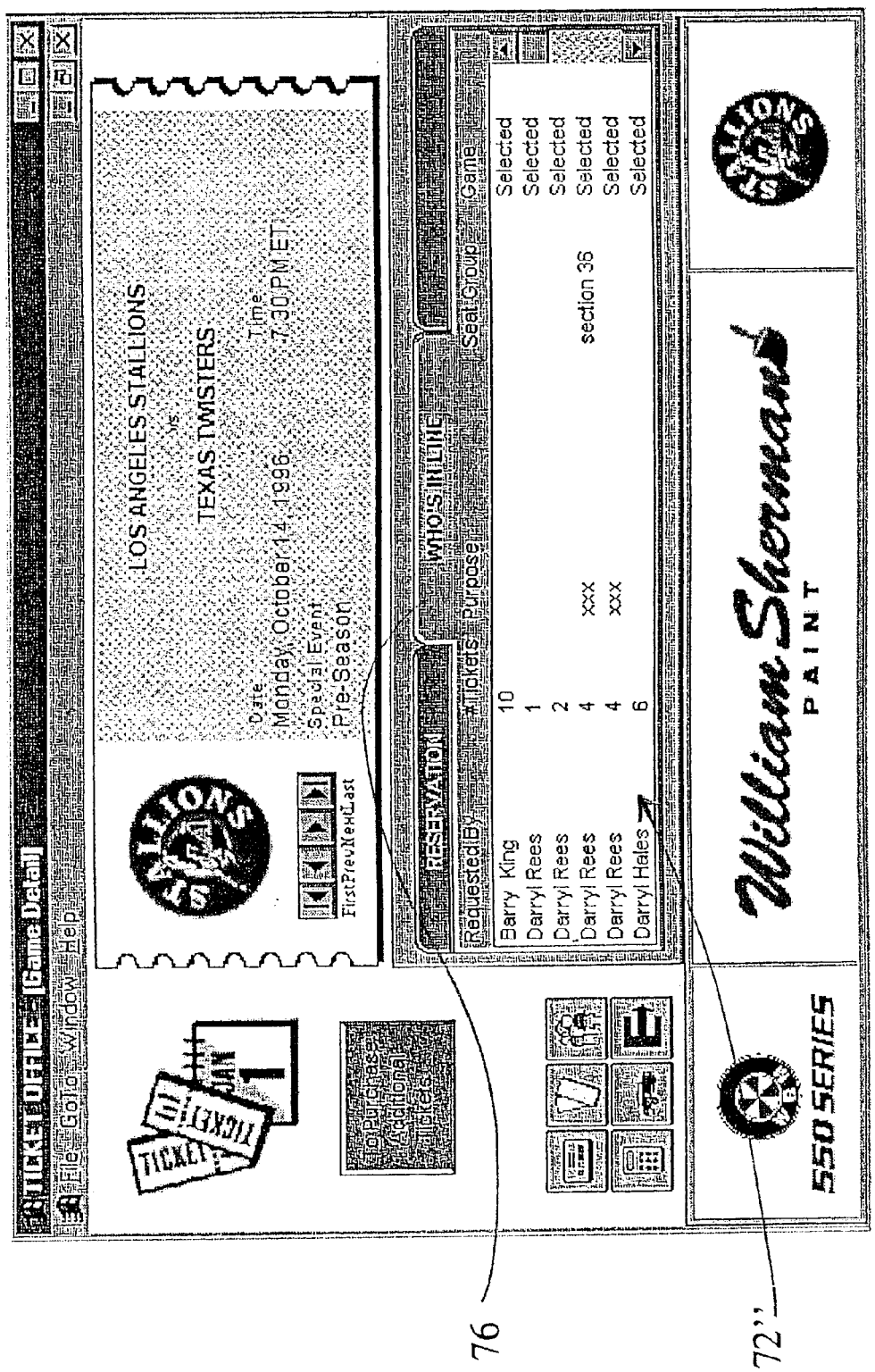
Figure 5:
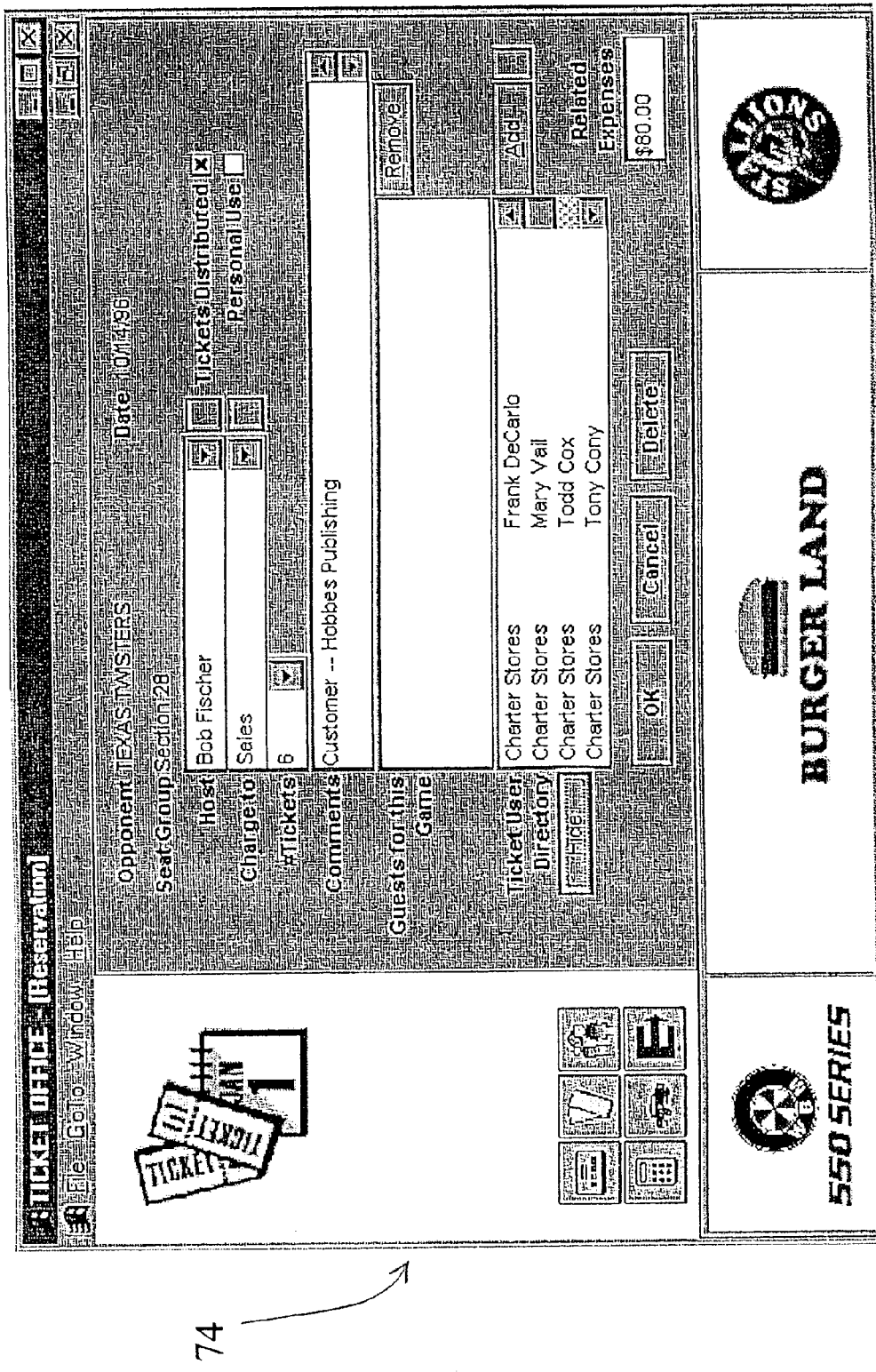
FIG. 5 schematically illustrates a reservation screen according to the present invention.

Referring again to the main menu screen 10 (FIG. 1), clicking on the ticket manager icon 12 in the main menu screen 10 brings up the ticket manager display screen 20 (FIGS. 3a–3d), wherein the ticket administrator can view the status of the various event dates of the ticket package in a calendar format (FIGS. 3a–3b) or scrolling list format (FIGS. 3c–3d).

The calendar format may show the full-season schedule (FIG. 3a) or the schedule in monthly increments (FIG. 3b). The user can toggle or switch between the full-season and monthly calendar formats. When in the full-season display format, the monthly format can be accessed by clicking on the month in question. When in the monthly format, the full-season can be displayed by clicking on the year. When in either the full-season or monthly formats, the scrolling format can be accessed by clicking on the game list-view icon. To return from the game list-view format (FIG. 3c) to the prior calendar type display, the user merely clicks on the calendar icon.

Regardless of the display format, event dates for which all tickets are available are shown in a first color so as to readily indicate to the ticket administrator and/or any other user that all tickets are available for that days event. Event dates for which tickets are not available, i.e., having already been assigned or allocated, are shown in a second color, different from the first color, so as to readily indicate to user that tickets for that particular event are not available. Event dates for which tickets are partially available, i.e., some of the tickets having already been allocated or assigned, are shown in a third color, different from the first and second colors, so as to readily indicate to the user that some of the tickets for that particular event are not available. Event dates for which tickets have not been purchased (i.e., not part of the ticket package(s)), are shown in a fourth color, different from the first, second, and third colors, so as to readily indicate to the user that tickets for that particular event are not internally available. Away games are shown in a fifth color different from the previously described first through fourth colors. Naturally, it is contemplated that various other indicators or marks, such as "X", or check, or alpha-numeric marks, may be interchanged with the preferred multi-color scheme described above to indicate ticket availability.

Regardless of the display format, for further information regarding a particular event, the user merely single-clicks on the game in question to reveal the game-ticket information, or double-clicks on the game in question to bring up the game detail screen 72. The game-ticket information displays the date, time, opponent, special promotions (if any), and general ticket availability associated with the game in question. A representative game-ticket information display is shown in FIG. 3C. The game detail screen 72 provides much more detailed information regarding the game in question, and permits the user to make a request for tickets.

The game detail screen 72 (FIGS. 4a–4b) includes information regarding the event in question, including the opponent, the starting time, and any special promotions to take place on that date. The game detail screen will also include a series of folders that provide further details regarding ticket availability and distribution for the game in question, including a reservation folder 74, and a queue or "who's in line" folder 76, and comments folder.

Clicking on the reservation folder 74 brings up a reservation screen 72' (FIG. 4a) which lists the seat group(s) for which tickets were/are available purchased for the game in question, the host or ticket user (if any), the number of tickets reserved, and the status of the tickets (whether distributed), as illustrated. Double clicking on the host ticket user will bring up the reservation detail screen (FIG. 5) wherein details of the reservation are shown. These details include the guests, comments associated with the event/tickets in question, whether the tickets have been distributed, and whether the tickets are for personal use, as illustrated. Double clicking an "Available" entry in the reservation folder will bring up a blank reservation detail screen (FIG. 5) wherein the ticket administrator can directly enter information regarding tickets which are to be reserved in favor of an identified host ticket user Clicking on the who's in line folder 76 brings up a who's in line screen 72" (FIG. 4b) which lists host ticket users who have requested tickets for the event in question. The who's in line screen 72" also lists the number of tickets requested, the purpose for using the tickets, the seat group requested, and whether the game was specifically selected, as illustrated. Double clicking on the host brings up the reservation screen wherein further details, as noted above, are illustrated regarding the ticket request. Viewing such details will assist the ticket administrator in determining or prioritizing ticket requests to maximize the benefit to the company/ticket package owner. If the ticket administrator wishes to convert a ticket request, displayed in the reservations detail screen (FIG. 5), into a reservation, the ticket administrator clicks "OK" at the reservation screen. If the ticket administrator does not click "OK", the request is not converted into a reservation. Only the ticket administrator can convert a ticket request (at the who's in line folder) into a reservation (shown in the reservation folder) use of the reservation detail screen, and directly enter reservations via the reservation detail screen.

Also accessible from the main menu screen 10 (FIG. 1) by clicking on the get-in-line icon 14 is the get-in-line screen 22 (FIG. 6) whereby the user may input information regarding ticket requests or queuing for one or more games. The user can request specific game(s), the next available game, and can input information relating to the business purpose of the ticket request, if any. Information input at the get-in-line screen 22 will update the database, will change the information shown on the game detail screen (FIGS. 4a–4b) who's in line folder 76, and will be accessible to the ticket administrator and other users, as noted hereinbefore.

Also accessible from the main menu screen 10 (FIG. 1) by clicking on the report icon 16 is the report screen 24 (FIG. 7) which provides various report formats, including schedule, ticket usage, and expense reports. The general information screen 26 (FIG. 8) is also accessible from the main menu screen 10 by clicking on the general information icon 18, and provides various preloaded information, such as parking maps, arena details, and seat locations. The general information also includes information about sponsors, such as contest details, printable coupons, and concession locations within the arena. Finally, the general information also includes team specific information, and may, for example, may include team highlights, statistics, and details regarding the players on the roster.

Figure 9:
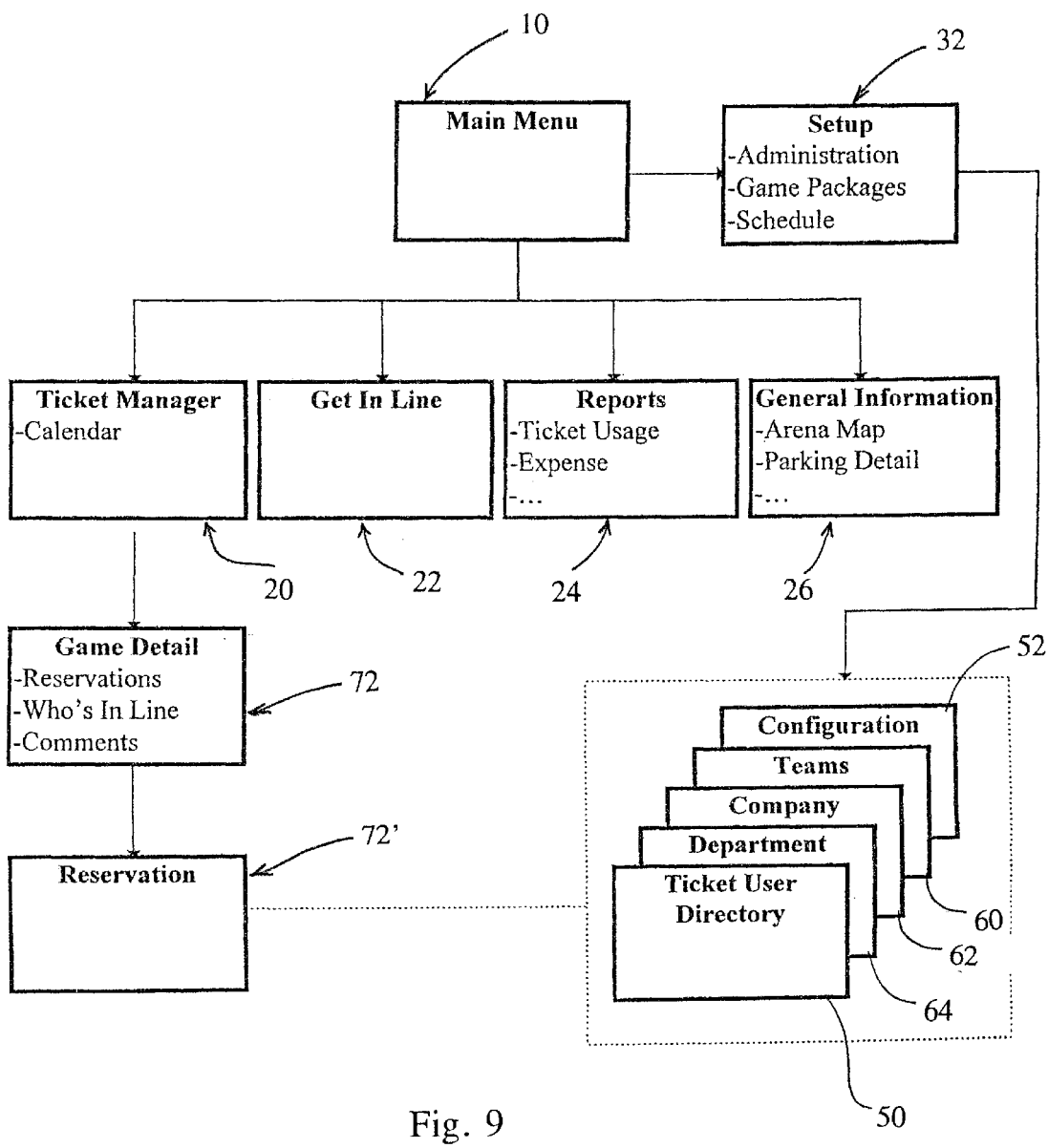
FIG. 9 is a flow chart schematically illustrating operational links and sequences according to the present invention.

With reference to FIG. 9a, interaction between the various portions of the computer process are schematically illustrated. FIG. 9a generally illustrates interaction and hierarchy between the various screens and functions provided by the computer process according to the present invention.

Also present in several of the screens is a "To Purchase Additional Tickets" icon, which is shown in a background-type color when tickets for the event date in question are available, but which is shown in a foreground-type color (or flashes) when all tickets for the event date have been reserved. In either case, clicking on the "Purchase" icon, takes the user to a ticket order request screen wherein required information is input (game date/number of tickets/ ticket price) to generate a ticket order form which can be directly faxed/mailed to the ticket sales office of the team to expedite purchase of additional tickets.

The following is a computer source listing of a computer program according to the present invention:

What is claimed is:

1. A computer process for managing a multiple event ticket package, said process comprising the steps of:
   selecting at least one multiple event ticket package to be tracked from a plurality of pre-defined multiple event ticket packages;
   inputting a number of tickets to be tracked for said at least one multiple event ticket package;
   displaying a schedule of events for said at least one multiple event ticket package, comprising the steps of:
      displaying events for which all of said tickets are available in a first format;
      displaying events for which some of said tickets have been reserved and are therefore unavailable in a second format, said second format being different from said first format;
      displaying events for which tickets are not available in a third format, said third format being different from said first and second formats;
      reserving tickets for an event date for which at least some of said tickets are available;
      modify said display of scheduled events to reflect changes in ticket availability.

2. A process according to claim 1, comprising the further steps of:
   inputting a request for tickets for an event date for which at least some of said tickets are available;
   storing said ticket request in a database;
   converting said ticket request into a reservation.

3. A process according to claim 1, wherein said request inputting step includes inputting information regarding the number of tickets requested, a host ticket user, and a guest ticket user, said process comprising the further steps of:
   generating a report of ticket usage by said ticket users;
   printing said report.

4. A computer process for managing a multiple game ticket package, said process comprising the steps of:
   selecting at least one multiple game ticket package to be managed from a plurality of pre-defined multiple game ticket packages;
   inputting a number of tickets to be tracked for said at least one multiple game ticket package;
   displaying a schedule including home games and away games, comprising the steps of:
      displaying home games for which all of said tickets are available in a first format;
      displaying home games for which some of said tickets have been reserved and are therefore unavailable in a second format, said second format being different from said first format;
      displaying home games for which tickets are not available in a third format, said third format being different from said first and second formats;
      displaying home games which are not part of said at least one multiple game ticket package in a fourth format, said fourth format being different from said first, second, and third formats;
      displaying away games in a fifth format, said fifth format being different from said first through fourth formats;
      reserving tickets for an event date for which at least some of said tickets are available;
      modify said display of scheduled events to reflect changes in ticket availability.

5. A process according to claim 4, comprising the further steps of:
   inputting a request for tickets for one or more home games for which tickets are available;
   storing said ticket request in a database.

6. A process according to claim 5, comprising the further steps of:
   accessing said stored ticket request in said database; and,
   converting said ticket request into a reservation.

7. A computer process for managing a plurality of multiple game ticket packages, said process comprising the steps of:
   selecting a first and a second multiple game ticket package to be managed from a plurality of pre-defined multiple game ticket packages;
   inputting seat locations for said first multiple game ticket package;
   inputting a number of tickets to be tracked for said first multiple game ticket package;
   inputting seat locations for said second multiple game ticket package;
   inputting a number of tickets to be tracked for said second multiple ticket game package;
   displaying a schedule including home games and away games, comprising the steps of:
      displaying, in a first format, home games for which all tickets of said first and second packages are available;
      displaying, in a second format, home games for which some tickets of said first and second packages have been reserved and are therefore unavailable, said second format being different from said first format;
      displaying, in a third format, home games for which tickets of said first and second packages are not available, said third format being different from said first and second formats;
      reserving tickets for an event date for which at least some of said tickets are available;
      modify said display of scheduled events to reflect changes in ticket availability.

8. A process according to claim 7, wherein said displaying step comprises the further steps of:
   displaying, in a fourth format, home games which are not part of said first and second packages, said fourth format being different from said first, second, and third formats.

9. A process according to claim 8, wherein said displaying step comprises the further step of:
   displaying, in a fifth format, away games, said fifth format being different from said first through fourth formats.

10. A process according to claim 7, comprising the further steps of:

inputting a request for tickets for one or more home games for which tickets are available;

storing said ticket request in a database.

11. A process according to claim 10, wherein said request inputting step comprises the further steps of:

selecting a seat location for which tickets are desired;

inputting a host ticket user name;

inputting a guest ticket user name;

inputting the number of tickets requested.

12. A process according to claim 11, comprising the further steps of:

accessing said stored ticket request;

converting said ticket request into a reservation.

13. A process according to claim 12, comprising the further step of:

modifying said display of scheduled home and away games to reflect changes in ticket availability.

* * * * *